United States Patent
Littmann

(10) Patent No.: US 11,156,588 B2
(45) Date of Patent: Oct. 26, 2021

(54) ULTRASONIC IDENTIFICATION AND AUTHENTICATION OF CONTAINERS FOR HAZARDOUS MATERIAL

(71) Applicant: THE EUROPEAN ATOMIC ENERGY COMMUNITY (EURATOM), REPRESENTED BY THE EUROPEAN COMMISSION, Brussels (BE)

(72) Inventor: François Littmann, Cocquio Trevisago (IT)

(73) Assignee: The European Atomic Energy Community (EURATOM), Represented by The European Commission, Brussels (BE)

( * ) Notice: Subject to any disclaimer, the term of this patent is extended or adjusted under 35 U.S.C. 154(b) by 208 days.

(21) Appl. No.: 16/095,329

(22) PCT Filed: Apr. 18, 2017

(86) PCT No.: PCT/EP2017/059171
§ 371 (c)(1),
(2) Date: Oct. 19, 2018

(87) PCT Pub. No.: WO2017/182462
PCT Pub. Date: Oct. 26, 2017

(65) Prior Publication Data
US 2019/0131023 A1    May 2, 2019

(30) Foreign Application Priority Data

Apr. 21, 2016  (EP) .................................. 16166465

(51) Int. Cl.
*G01N 29/44*    (2006.01)
*G09F 3/02*     (2006.01)
(Continued)

(52) U.S. Cl.
CPC .............. *G01N 29/44* (2013.01); *G01N 29/07* (2013.01); *G09F 3/02* (2013.01); *G21F 5/005* (2013.01); *G21F 5/06* (2013.01)

(58) Field of Classification Search
CPC .......... G01N 29/44; G01N 29/07; G09F 3/02; G21F 5/005; G21F 5/06
(Continued)

(56) References Cited

U.S. PATENT DOCUMENTS

| 4,309,904 A | * | 1/1982 | Jones ..................... G06K 19/06 |
| | | | 73/597 |
| 4,530,241 A | | 7/1985 | Crutzen et al. |

(Continued)

FOREIGN PATENT DOCUMENTS

| EP | 1 826 422 A1 | 8/2007 |
| EP | 1 987 261 | 8/2007 |

(Continued)

OTHER PUBLICATIONS

European Search Report for corresponding priority Application No. 16166465.1, dated Oct. 28, 2016 (8 sheets).

(Continued)

*Primary Examiner* — Lisa M Caputo
*Assistant Examiner* — Rose M Miller
(74) *Attorney, Agent, or Firm* — Lewis Roca Rothgerber Christie LLP

(57) ABSTRACT

A container for nuclear and/or hazardous material including a container body and lid made of metal in which the body and lid are welded together to form a sealed container. Scannable elements are spatially distributed on the lid and adapted to be scanned with an ultrasonic scanner. One or more of the scannable elements is an inclined surface element, each inclined surface element being inclined relative to the axis of the lid. Upon scanning the scannable (Continued)

elements, the ultrasonic scanner produces a first scan signal. The first scan signal is based upon which of the scannable elements are inclined surface elements, and includes an identification code. A second scan signal is obtained by scanning a signature surface element in a weld zone between the body and lid. The lid may be identified/authenticated using a third signal derived from the intersection of the first and second scan signals.

18 Claims, 10 Drawing Sheets

(51) Int. Cl.
    *G21F 5/005*      (2006.01)
    *G21F 5/06*      (2006.01)
    *G01N 29/07*      (2006.01)

(58) Field of Classification Search
    USPC .......................................................... 73/597
    See application file for complete search history.

(56) References Cited

U.S. PATENT DOCUMENTS

| | | | | | |
|---|---|---|---|---|---|
| 5,089,213 | A | * | 2/1992 | Omote | G21C 17/06 |
| | | | | | 376/248 |
| 5,167,910 | A | * | 12/1992 | Omote | G21C 17/06 |
| | | | | | 376/434 |
| 5,608,199 | A | * | 3/1997 | Clouse, III | G06K 19/041 |
| | | | | | 235/435 |
| 2005/0092091 | A1 | * | 5/2005 | Greelish | G01N 29/4427 |
| | | | | | 73/617 |
| 2013/0327827 | A1 | * | 12/2013 | Lautzenhiser | G05B 19/126 |
| | | | | | 235/439 |
| 2015/0197372 | A1 | * | 7/2015 | Majlof | B01L 3/508 |
| | | | | | 206/459.5 |
| 2017/0102362 | A1 | * | 4/2017 | Sackmann | B01L 3/0268 |

FOREIGN PATENT DOCUMENTS

| | | |
|---|---|---|
| JP | 55-144541 A | 11/1980 |
| JP | 2002-296383 A | 10/2002 |
| KR | 10-0922495 B1 | 10/2009 |

OTHER PUBLICATIONS

International Search Report and Written Opinion for corresponding International Application No. PCT/EP2017/059171, dated Aug. 2, 2017 (9 sheets).
Australian Office Action for corresponding Australian Patent Application No. 2017251939, dated Jul. 28, 2020 (3 sheets).
European Office Action for corresponding European Patent Application No. 17717739.1, dated Sep. 12, 2019 (6 sheets).
Japanese Office Action Summary and Machine Translation for corresponding Japanese Patent Application No. 2018-555197, dated Apr. 6, 2021 (7 sheets).
Korean Office Action English Translation for corresponding Korean Patent Application No. 10-2018-7033736, dated Sep. 19, 2019 (5 sheets).

* cited by examiner

ULTRASONIC IDENTIFICATION AND AUTHENTICATION OF CONTAINERS FOR HAZARDOUS MATERIAL

CROSS REFERENCE TO RELATED APPLICATIONS

This application is a National Phase Patent Application of and claims priority to and the benefit of International Patent Application Number PCT/EP2017/059171, filed on Apr. 18, 2017, which claims priority to EP Patent Application Number 16166465.1, filed on Apr. 21, 2016. The entire contents of both of which are incorporated herein by reference.

TECHNICAL FIELD

The present invention generally relates to containers for containing and/or transporting nuclear or other hazardous material. Such containers comprise means for identifying and/or authenticating an individual container. The invention further relates to a method of identifying and authenticating the containers.

BACKGROUND ART

Under some circumstances, the secure sealing of containers is necessary. It is of particular importance if such containers hold dangerous substances, such as for example fissile materials.

There is being developed a concept for final disposal of spent fuel from nuclear installations. The spent fuel is planned to be encapsulated in copper containers or "canisters", for long-term deposition. The copper lid will be friction stir welded onto the copper canister, the weld will be checked and the surface of the canister will be polished and decontaminated.

One solution has been proposed involving the use of a tungsten plate and different radio-isotopes: the plate is placed inside the canister before closing the lid, an external radio-isotope detector will be used to decode the code. However, it is only an identification method and does not provide authentication/verification. Up to now, it is not allowed to insert any foreign object into the canister.

Safeguards approaches propose to use canister identification to support the Continuity of Knowledge (CoK) principle. However, there has not to date been presented any suitable method for labelling the copper canisters. An engraving or marking of the canister may impede the long term safety and integrity of the canister since it may trigger a corrosion process. To date, no method has been suggested for a unique identification/verification that is difficult to falsify.

U.S. Pat. No. 4,530,241A discloses techniques in which a material such as fissile material requiring to be safeguarded is stored inside a container which is subsequently sealed, for example by a closure comprising a cover and sealing element. The whole structure of the container is ultrasonically scanned initially using piezo electric transducers to obtain an output from which is derived a distinctive identity for the container, determined by the particular characteristics of the internal structure of at least a portion of the container, and also a reference signal indicative of the whole container structure when its integrity is intact.

Technical Problem

A problem is that the canisters, once loaded, friction stir welded and machined, will be all identical. No external marking, tagging or any alteration is allowed. There is no way to differentiate one from the other with conventional methods like 3D measurement of the welds or non-destructive control of the stir weld because there is fusion of the lid and the canister.

Identification and unique integrity is needed to maintain the CoK from the encapsulation plant at the beginning of the process to the deep repository area at the end.

It is thus an object of the present invention to provide a lid and/or container with improved identification/authentication features and which are difficult to falsify, such as defined in claim 1. It is a further object of the present invention to provide a method of identifying/authenticating a container, such as defined in claim 24.

General Description of the Invention

According to one aspect of the invention there is provided a container for nuclear and/or hazardous material, the container comprising a container body made of metal and a lid made of the same metal as the container body, the lid and container body being adapted to be welded together to form a sealed container. The lid comprises a plurality of scannable elements, the scannable elements being spatially distributed on the lid and adapted to be scanned with a first ultrasonic scanner. One or more of the scannable elements is an inclined, preferably planar, surface element, each inclined surface element being inclined relative to the axis of the lid. In use, scanning of the scannable elements with said ultrasonic scanner produces a first scan signal, the first scan signal being dependent upon which of said scannable elements are inclined surface elements.

The lid and container body are friction welded together to form a sealed container such that a weld zone conferring unique properties on the container is formed at abutting surfaces of the container body and lid. The weld zone is adapted to be scanned with a second ultrasonic scanner. In use, scanning of the weld zone with the second ultrasonic scanner produces a second scan signal, the second scan signal being dependent upon said unique properties of the weld zone of the container.

As no external marking is allowed, in embodiments, there are created internally on the lid, before welding, some cavities to be read from the outside using ultrasonic transducers once the lid has been welded. In addition to this identification a further ultrasonic reading from the stir friction weld is used to give an authentication signature.

An advantage of the invention is that it enables safeguards agencies to maintain the Continuity of Knowledge (CoK) of the canister from the factory to the repository. In addition, it is simple, easy to manufacture and efficient.

While two separate scanners may be used as first ultrasonic scanner and second ultrasonic scanner, it may be advantageous to use only one scanner for producing both the first and the second scan signal.

Preferably, the axis is perpendicular to the plane of a base surface of the lid.

Preferably, the first scan signal indicates an identity code of the container.

Preferably, the lid is round and the scannable elements are disposed at a circumferential perimeter of the lid. The scannable elements may be randomly spaced; preferably however they are equally spaced. The scannable elements may be arranged on a peripheral edge of the lid. Preferably, the peripheral edge is at the lowermost part of the lid.

Preferably, the scannable elements comprise consecutive, equal length arcs of said circumferential perimeter. Preferably, the arcs define an angle at the centre of the lid of 4-8 degrees, 5 to 7 degrees, or of 6 degrees.

Preferably, the lid has a flattened U-shaped cross-section.

Preferably, a base wall and a sidewall of the lid have a thickness greater than a predetermined minimum thickness; and a thickness of the lid between the inclined planar surface element and a nearest point on an upper surface of the lid is greater than the predetermined minimum thickness.

In one embodiment, the lid has an axial cross-section whereby a first outer surface portion is defined thereon, for abutment with a first inner surface portion of the container body. Preferably, a base surface of the lid is defined extending perpendicular to the axis, and wherein the peripheral edge is defined by the intersection of the first outer surface portion and the base surface.

In one embodiment, for each inclined surface element, the angle of inclination is one of a plurality of predetermined angles. Preferably, the angle of inclination is in the range 40 to 60 degrees, 45 to 55 degrees or 47.5 to 52.5 degrees, or is 50 degrees.

According an aspect of the invention, lid and container body are friction welded together to form a sealed container such that a weld zone conferring unique properties on the container is formed at abutting surfaces of the container body and lid.

Preferably, the lid has a first outer surface portion for abutment with a first inner surface portion of the container body.

Preferably, the lid has a second outer surface portion for abutment with an end surface portion of the container body.

In embodiments, the weld zone overlaps at least a portion of (i) the abutting first outer surface portion and first inner surface portions, and/or (ii) the abutting second outer surface portion and end surface portions.

In embodiments, in the vicinity of the weld zone, a signature surface element is formed by (i) a portion of the abutting first outer surface portion and first inner surface portions external to and adjacent the weld zone, and/or (ii) a portion of the surface of the weld zone inside the container body and adjacent the abutting first outer surface portion and first inner surface portions. The unique properties of the container are dependent on said signature surface element.

Preferably, in use, scanning of the vicinity of the weld zone with a second ultrasonic scanner produces a second scan signal, the second scan signal being dependent on said unique properties and/or said signature surface element.

According to another aspect of the invention there is provided a method of identifying a container for nuclear and/or hazardous material, the method comprising providing a container as described above, and providing a reading apparatus, the reading apparatus having a first ultrasonic scanner. The method includes operating the reading apparatus whereby the first ultrasonic scanner scans the scannable elements to produce a first scan signal indicative of an identification code of the container.

According to another aspect of the invention there is provided a method of authenticating a container for nuclear and/or hazardous material, the method comprising performing the method of the preceding paragraph. The reading apparatus has a second ultrasonic scanner, and operating the reading apparatus is such that the second ultrasonic scanner scans the vicinity of the weld zone to produce a second scan signal dependent on said unique properties and/or said signature surface element. The method may further include deriving a third scan signal as the intersection of the first scan signal and the second scan signal. The method may further include comparing the third scan signal with at least one pre-stored signal to thereby identify and/or authenticate the container.

Preferably, the container body is substantially cylindrical, the lid is round; and operating the reading apparatus comprises rotating the reading apparatus about the axis through the centre of the lid.

The method preferably further comprises disposing water in an upper part of the lid whereby, during said operating the reading apparatus the reading apparatus is at least partially submerged in water.

Preferably, during said operating the reading apparatus, the first ultrasonic transducer is mounted so as to direct first ultrasonic waves at an angle of incidence ($\alpha_1$) to the plane of the base surface of the lid. Preferably, the angle of incidence ($\alpha_1$) is derived by Snells law from the difference in speed of the first ultrasonic waves in water and in the material from which the lid is made.

Preferably, the lid and container body are made of copper. Preferably, the angle of inclination ($\alpha_2$) is 50 degrees and the angle of incidence ($\alpha_1$) is 14 degrees.

Preferably, during said operating the reading apparatus, the second ultrasonic transducer is mounted so as to direct second ultrasonic waves substantially parallel to the plane of base surface, e.g. substantially horizontally.

Preferably, comparing the third scan signal with at least one pre-stored signal comprises: using the identification code obtained from the first signal, retrieving the at least one pre-stored signal, the or each pre-stored signal being a pre-stored verification signal or signature; calculating a correlation factor between the third scan signal and the pre-stored signal; and determining that the container is authenticated if the correlation factor is above a predetermined threshold indicative of authenticity.

According to another aspect of the invention there is further provided a recordable, rewritable or recorded medium having recorded or stored thereon machine readable data defining or transformable into instructions for execution by processing circuitry.

According to another aspect of the invention there is still further provided a server computer incorporating a communications device and a memory device and being adapted for transmission on demand or otherwise of data defining or transformable into instructions for execution by processing circuitry.

BRIEF DESCRIPTION OF THE DRAWINGS

Further details and advantages of the present invention will be apparent from the following detailed description of several not limiting embodiments with reference to the attached drawings, wherein.

DESCRIPTION OF PREFERRED EMBODIMENTS

In the description and drawings, like numerals are used to designate like elements. Unless indicated otherwise, any individual design feature, component or step may be used in combination with any other design features, components or steps disclosed herein.

As mentioned above, it is desirable for canisters containing spent nuclear fuel to be deposited in granite bedrock about 500 m underground.

The typical cooling times of the spent fuel vary from 10 up to 60 years, in underwater storage ponds. After that period, the fuel is moved to a transfer canister, which will be filled with the fuel that is going to be encapsulated. The transfer canister is moved to the handling cell where the assemblies are lifted up one by one, dried and then put in the copper canister. This is the last position where the fuel can be identified before the lid is put on the copper canister.

The copper canisters will have an insert of cast iron which in turn has prepared positions for 12 BWR fuel or 4 PWR fuel assemblies. The copper lid will be friction stir welded onto the copper canister, the weld will be checked and the surface of the canister will be polished and decontaminated. The full canister will finally be placed inside a specially designed transport cask and temporarily stored at the facility before being shipped to the geological repository site.

Those canisters will be welded and then transported by road and sea from the factory to the deep repository area, it is of utmost importance to assure this CoK by an identification and even better a unique authenticated signature.

Figure 1:
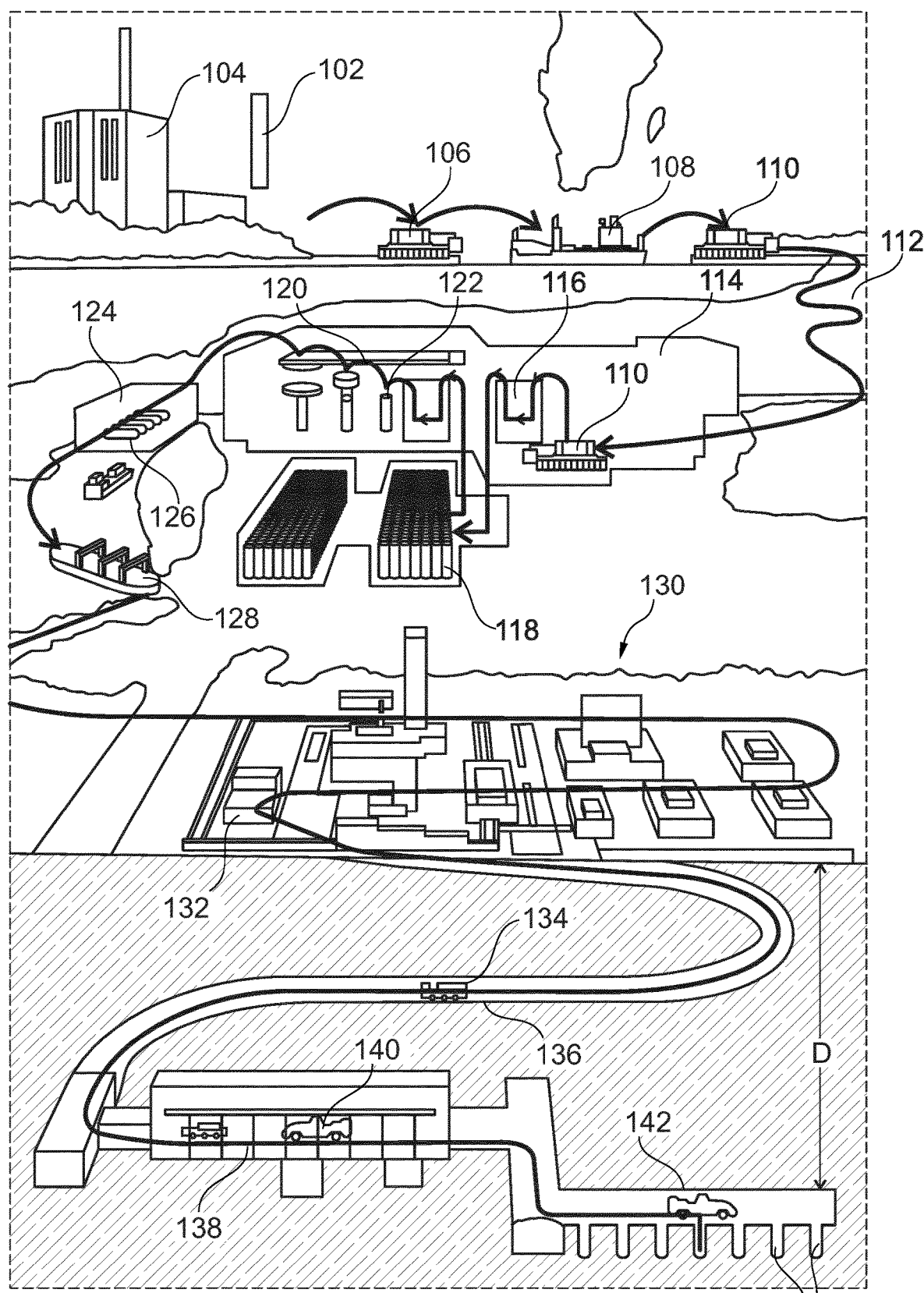
FIG. 1 shows an example of a handling process of spent nuclear fuel, from a nuclear power plant to a final deposition site.

FIG. 1 shows an example of a handling process of spent nuclear fuel, from a nuclear power plant to a final deposition site.

Fuel assemblies 102 from a nuclear power plant 104 may be transported using road transport vehicle 106 to an off-loading point at which the fuel assemblies 102 may be transferred to ship 108 for transport to a distant location. At the latter, the fuel assemblies may be transported using road transport vehicle 110 by road 112 to an interim storage and processing site 114. At the interim storage and processing site 114, the fuel assemblies may be offloaded at a receiving section 116 and stored in a storage pool 118 for a predetermined period, as is well known in the art.

In encapsulation section 120, the nuclear fuel assemblies 102 may be encapsulated in canisters 122 as illustrated in FIG. 2(a). The canisters 122 may be transferred to a holding area 124 where they may be held for some time, before being transferred by road transport vehicle 126 to ship 128. On ship 128 the canisters 122 may be transported to the site of a final repository 130, where they may be held in a holding area 132. From the holding area 132 the canisters 122 may be transported using an internal vehicle 134 on a ramp 136 to a first underground area 138, where the canisters may be transferred to a deposition machine 140. Thereafter, the canisters 122 may be transferred using the deposition machine 140 to a second underground area 142 at a depth D below ground, where the canisters 122 may be placed in deposition holes 144. The depth D may be of the order of 500 m.

Figure 2:
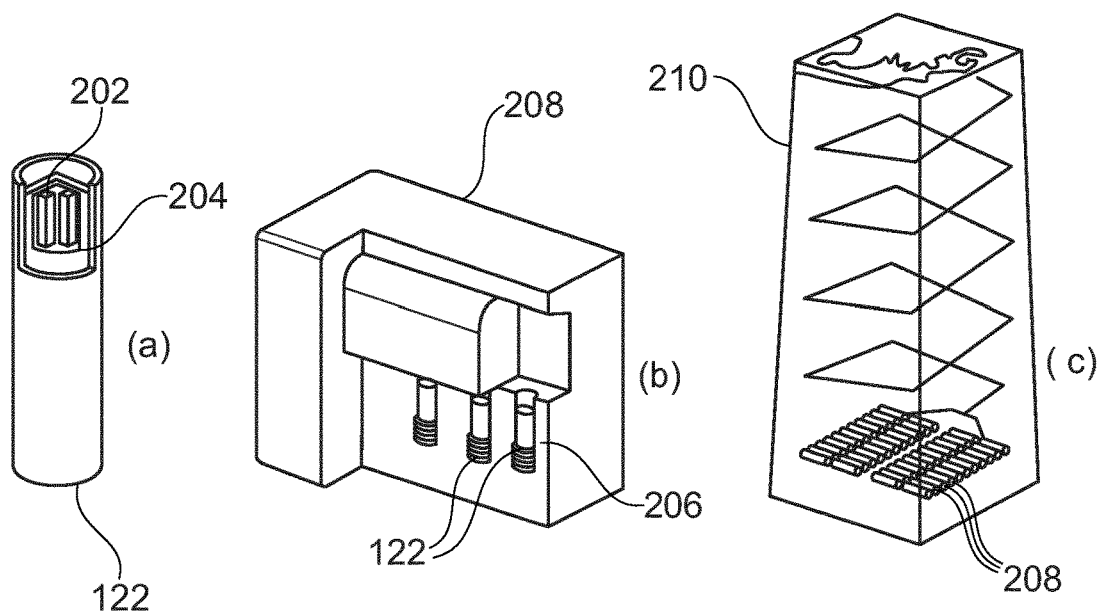
FIG. 2 shows (a) a canister, (b) a clay storage element and (c) a final repository structure used in the process of FIG. 1.

FIG. 2 shows (a) a canister, (b) a clay storage element and (c) a final repository structure used in the process of FIG. 1. As seen in FIG. 2(a), canister 122 may encapsulate a number of fuel assemblies 202 which may be slotted into recesses of a cast iron insert 204, as will be discussed in further detail hereinafter.

For long term deposition in the repository, each canister may be disposed in a respective hole 206 of a bentonite (clay) encapsulation element 208, as seen in FIG. 2(b). Further, as seen in FIG. 2(c), the storage elements 208 may be disposed in arrays in successive layers in the final repository storage arrangement 210.

Figure 3:
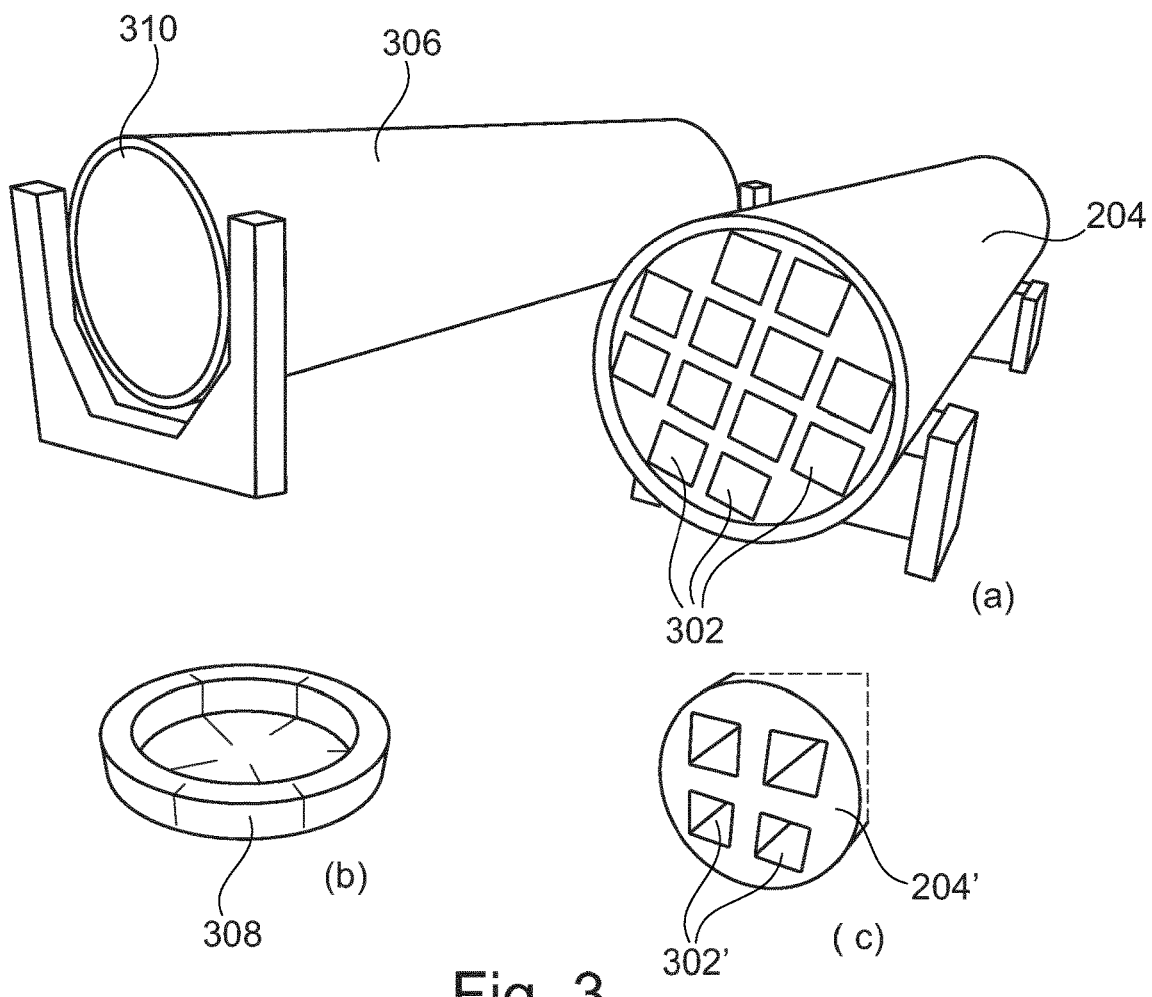
FIG. 3 shows the canister of FIG. 2(a) in dismantled form—(a) container body and insert, (b) lid and (c) alternative form of insert.

FIG. 3 shows the canister of FIG. 2(a) in dismantled form—(a) container body and insert, (b) lid and (c) alternative form of insert. Referring to FIG. 3(a), an insert 204, e.g. made of cast iron, may include a number of elongate recesses 302 (here, eight) for receiving fuel assemblies (not shown) for long term storage. For encapsulation, the insert 204 is inserted into the container body 306 and then the lid 308 mounted over the end 310. In an alternative embodiment (FIG. 3(c)), the insert 204' comprises only four elongate recesses 302'.

Figure 4:
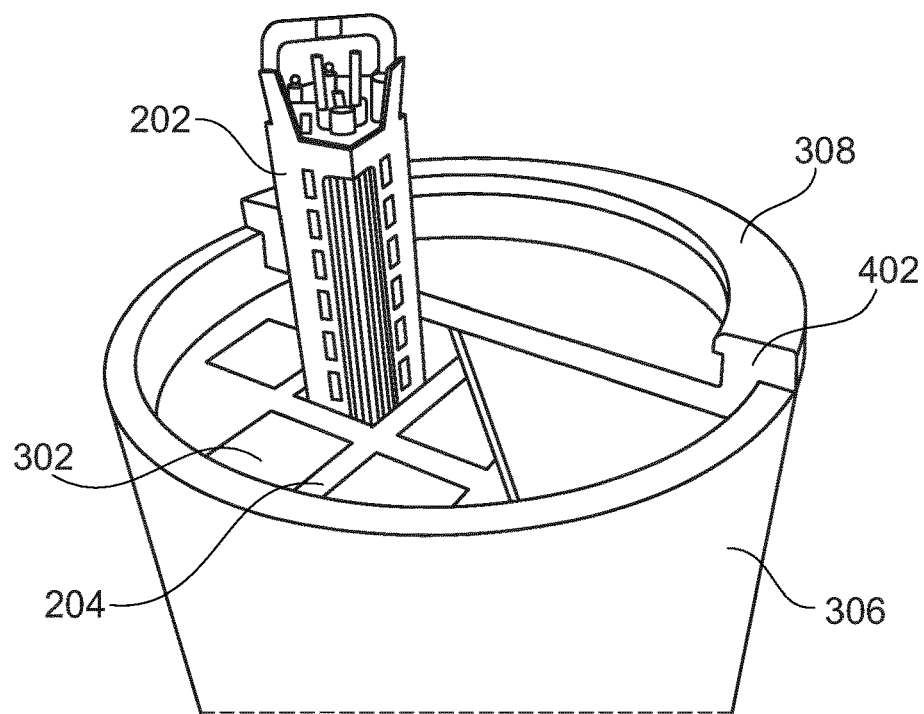
FIG. 4 shows the canister of FIG. 2(a) with partially cut-away lid.

FIG. 4 shows the canister of FIG. 2(a) with partially cut-away lid 308. As can be seen, a fuel assembly 202 is slotted into an elongate recess 302 of insert 204. Also, as can be seen from the partially cut-away lid 308, the latter includes an outer shoulder 402, whereby surfaces of the lid 308 rest on and are in abutment with correspondingly shaped surfaces of the container body 306.

Figure 5:
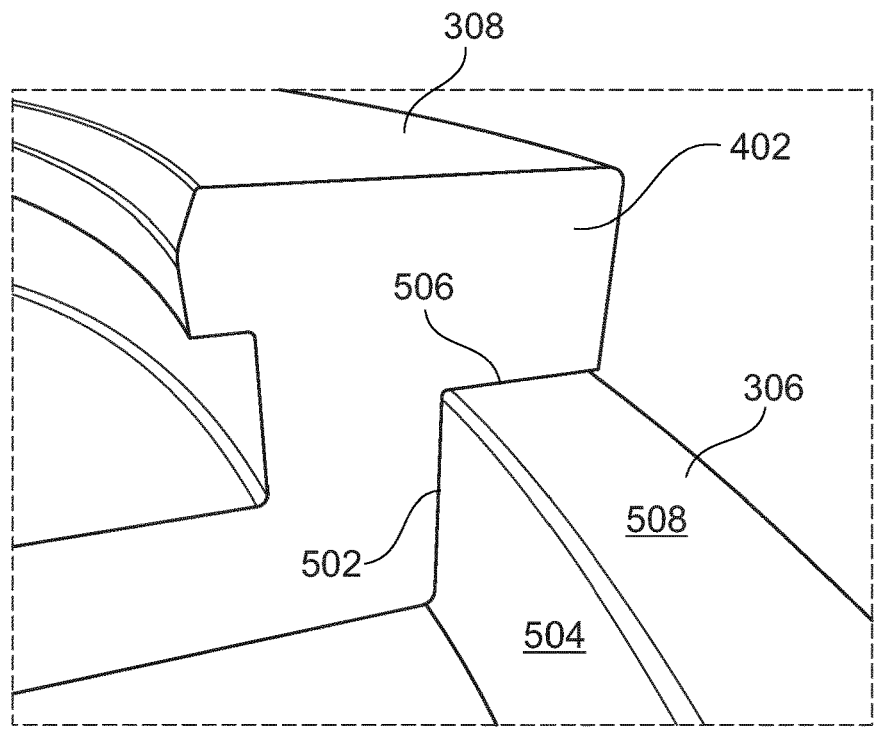
FIG. 5 shows in close-up a portion of the lid and container body of FIG. 4.

FIG. 5 shows in close-up a portion of the lid 308 and container body 306 of FIG. 4. As seen in more detail in FIG. 5, the lid 308 includes at its periphery the shoulder 402 such that the lid has a first (circumferentially extending) outer surface portion 502 disposed adjacent to or in contact with a first inner surface portion 504 of container body 306. In addition, the lid 308 includes a second (radially extending) surface portion 506 disposed adjacent to or in contact with end surface portion 508 of container body 306. FIG. 5 thus shows the junction of the lid 308 and container body 306 prior to friction stir welding.

Figure 6:
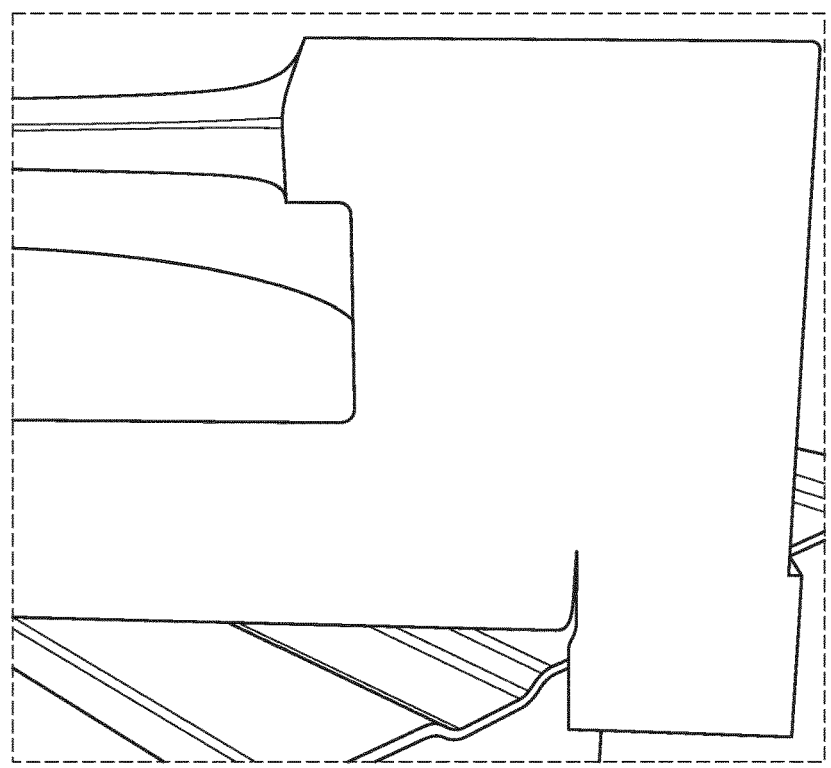
FIG. 6 is a cut-away view of the portion of the lid and container body of FIG. 5, after friction stir welding.

FIG. 6 is a cut-away view of the portion of the lid 308 and container body 306 of FIG. 5, after friction stir welding. As can be seen, following the friction stir welding operation, the joining of the materials of the lid 308 and the container body 306 is such that the first and second inner surface portions 502, 506 and the inner surface portion 504 and end surface portion 508 are essentially no longer to be distinguished. The lid 308 is thus strongly and tightly bonded to the container body 306 for safely encapsulating the nuclear material disposed therein.

Figure 7:
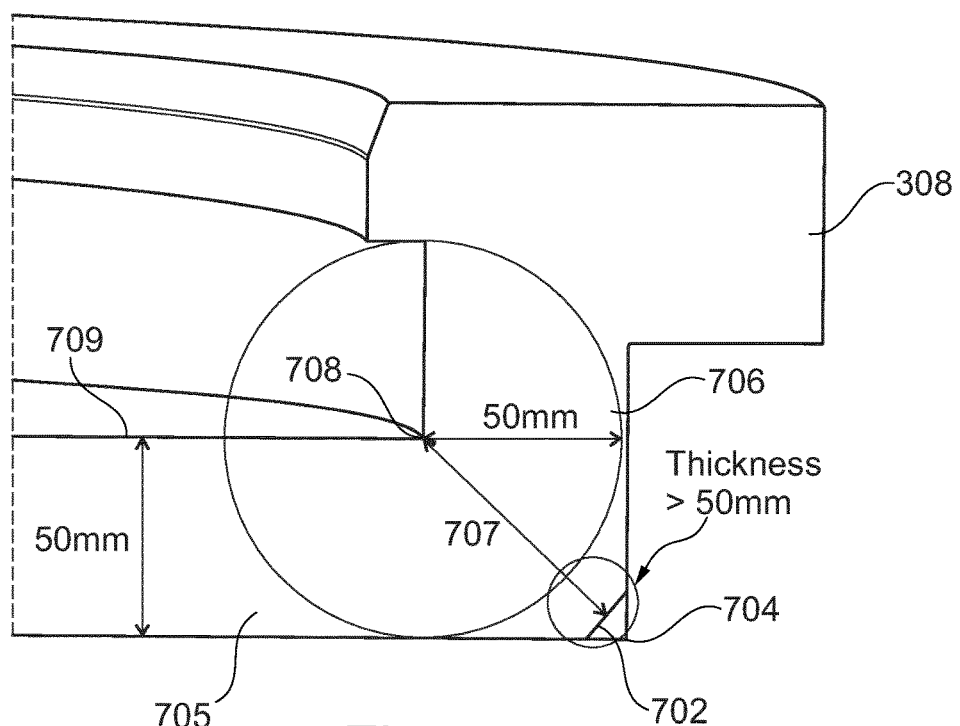
FIG. 7 is a partial cross-sectional view of the lid in accordance with an embodiment of the invention, showing the perimeter thereof.

FIG. 7 is a partial cross-sectional view of the lid 308, showing the perimeter thereof. In the case of encapsulation in a copper canister 122, it is typically desirable that at all points within the canister 122, the thickness of material (copper) between the internal cavity and the exterior is less than or equal to a minimum predetermined thickness. This thickness may be, for example, 50 mm of copper. In accordance with embodiments of the invention, an inclined surface portion 702 is formed at the lower edge 704 of lid 308, e.g. by machining. Such an inclined surface portion 702 may be formed at any of multiple locations around the lid 308, and is preferably planar. Once machined to produce inclined surface portion 702, it can be seen that the thickness not only base wall 705 and sidewall 706, but also the thickness 707 of the lid 308 between the inclined planar surface element 702 and a nearest point 708 on an upper surface 709 of the lid (308) is greater than the predetermined minimum thickness, e.g. 50 mm.

Figure 8:
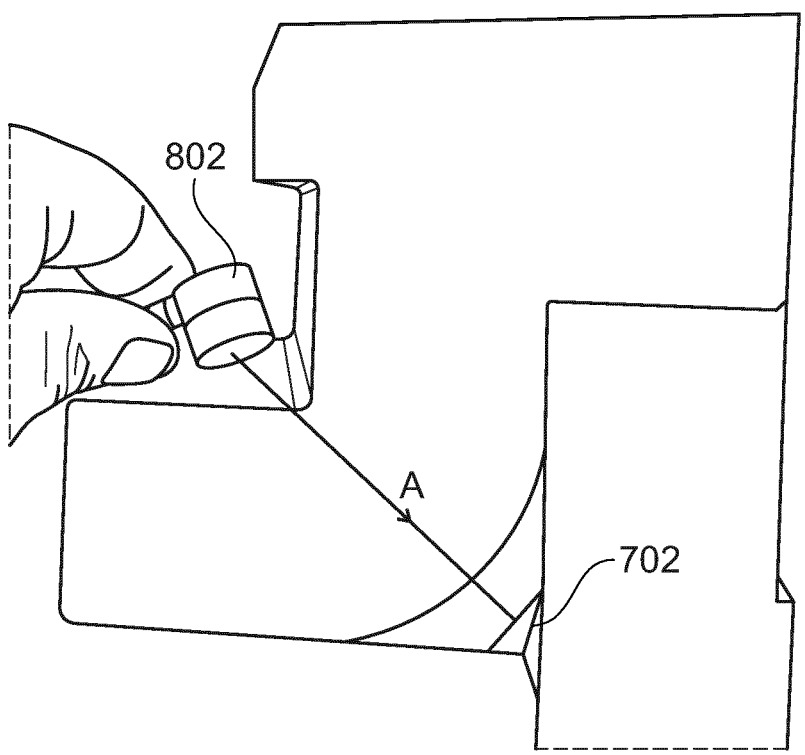
FIG. 8 illustrates the detection of an inclined plane on the lid of FIG. 7 using an ultrasonic detector.

FIG. 8 illustrates the detection of an inclined plane (surface portion 702) using an ultrasonic detector. In accordance with embodiments of the invention, each (circumferential) location where an inclined surface portion 702 is (or might be) scanned is using a first ultrasonic scanner 802 (here, positioned manually for the sake of illustration). The first ultrasonic transducer transmits ultrasonic energy as indicated in the direction of arrow A and receives one type of returned signal in the event that an inclined surface portion 702 is present and a second type of return signal in the event that no inclined surface portion 702 is present at that circumferential location.

Figure 9:
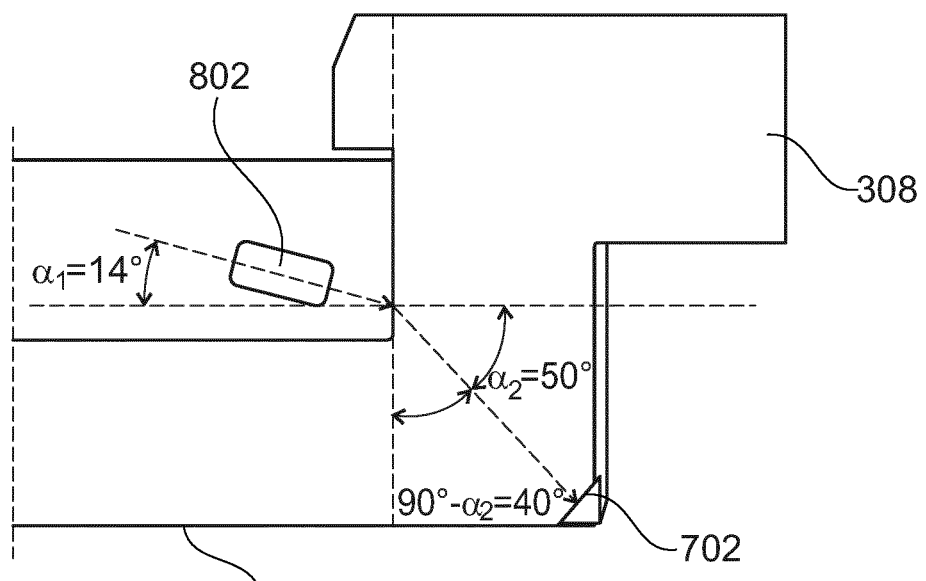
FIG. 9 shows in more detail the detection of an inclined plane, showing angles of incidence and transmission.

FIG. 9 shows in more detail the detection of an inclined plane (surface portion 702), showing angles of incidence and transmission. For the purposes of ultrasonic detection of inclined surface portions 702, due to Snells law in physics, the angle of inclination al of the first ultrasonic transducer 802 is given by the difference in speed of the ultrasonic waves between water and copper (as the first ultrasonic transducer 802 is submerged in water during the ultrasonic scanning process, as described hereinafter). As shown in FIG. 9, if the inclined surface portion 702 is at an angle of 40 degrees to the axis of the lid, i.e. the inclined surface portion is at an angle of $\alpha_2=(90-40=)$ 50 degrees to the plane containing the base surface 902 of the lid 308, then Snells law gives an angle of an incidence $\alpha_1$ of 14 degrees in water.

Figure 10:
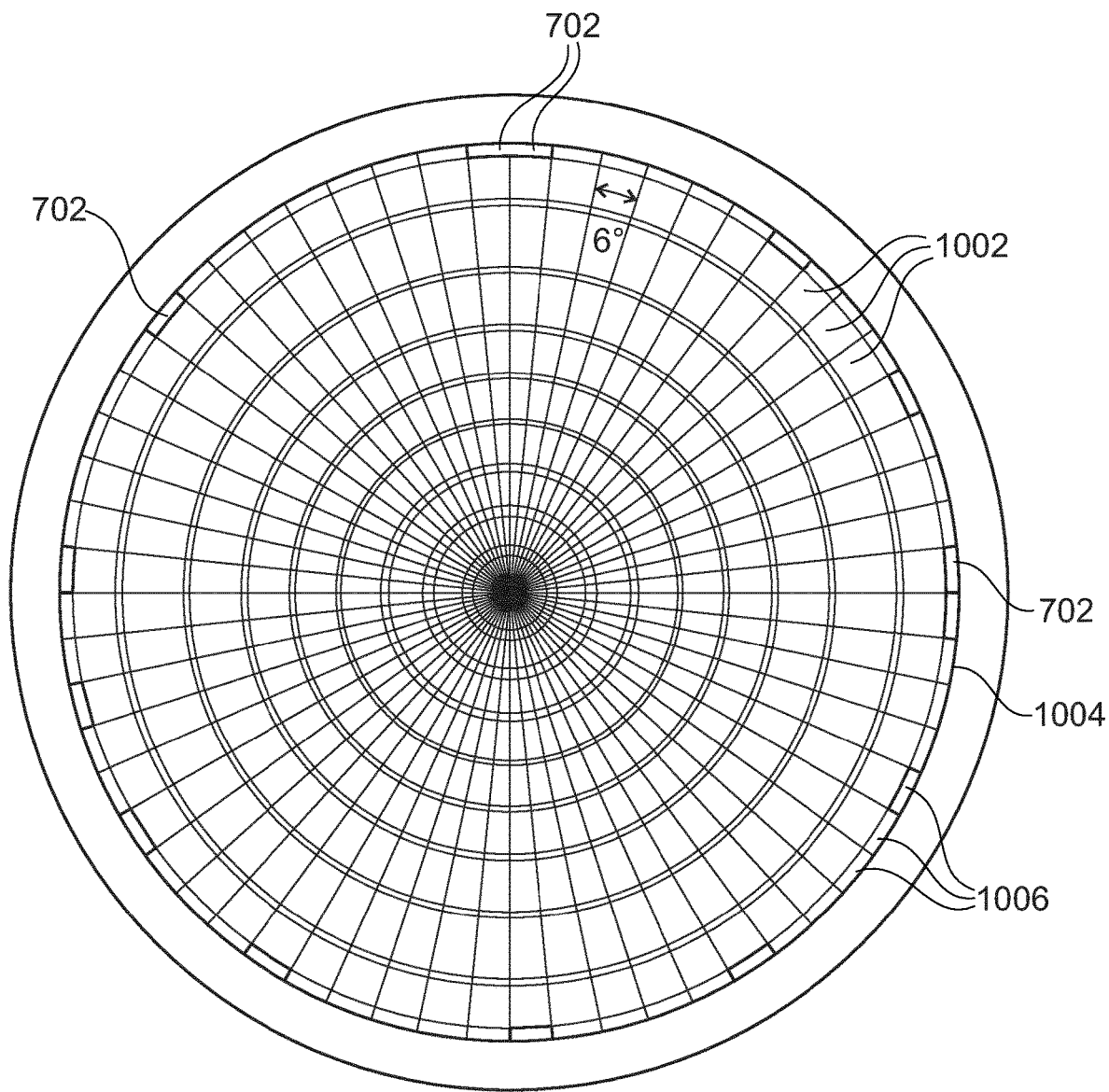
FIG. 10 is a schematic view of a lid in accordance with an embodiment of the invention, showing the distribution of scannable elements around the circumference of the lid.

FIG. 10 is a schematic view of a lid in accordance with an embodiment of the invention, showing the distribution of scannable elements around the circumference of the lid. As used herein, "spatially distributed" may be interpreted that the scannable elements are distributed such that (i) the centres of adjacent scannable elements are disposed on the lid 308 in a spaced apart, e.g. equally spaced, relationship, or (ii) adjacent scannable elements are disposed on the lid 308 in a non-overlapping relationship, in each case when viewed from the point on the lid 308 from which the first ultrasonic scanner 802, in use, performs scanning. In the embodiment of FIG. 10, the lid is considered to be divided into a large number of sectors 1002. In this embodiment, there are 60 sectors, i.e. each defining an angle of 6 degrees; however, it will be appreciated by persons skilled in the art that the number of sectors may be substantially less than 60 or greatly in excess of 60. There are thus defined, at the perimeter 1004 (corresponding to circumferential edge 704; FIG. 7) 60 scannable elements (portions of arc) 1006, at each of which an inclined surface portion 702 may or may not be present. Thus, the number and relative position of the inclined surface portions 702 enables a very large number of identification codes to be provided on the periphery 1004. The arrangement of scannable elements 1006 (with or without inclined surface portion 702) effectively forms a barcode, the latter enabling identification of the lid 308 (and thus the canister 122) from thousands of different such canisters 122.

Figure 11:
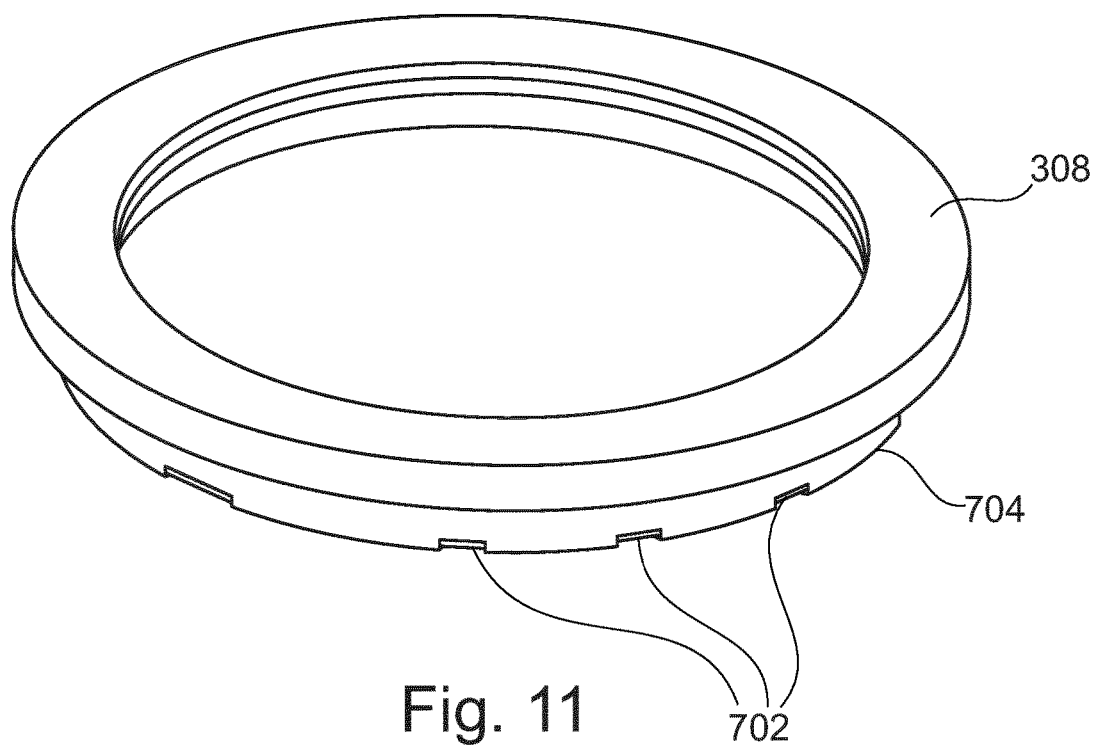
FIG. 11 is a lateral view of the lid of FIG. 10.

FIG. 11 is a lateral view of the lid of FIG. 10. Here, the inclined surface portions 702 at the circumferential edge 704 of the lid 308 can clearly be seen.

As discussed above, the disclosed embodiments enable identification of a given canister 122, i.e. provide a solution to the identification problem. However, there exists the possibility that a "barcode" (pattern of inclined surface portions) on one lid 308 could be copied and a fake canister 122 made with the same identification code. It is therefore important to associate this identification (barcode) with another unique, non-reproducible, feature which will provide authentication that the canister 122 is the right canister. Accordingly, in accordance with embodiments of the invention, a second ultrasonic transducer may be used to detect irregularities in the metal around the friction stir welding area.

Figure 12:
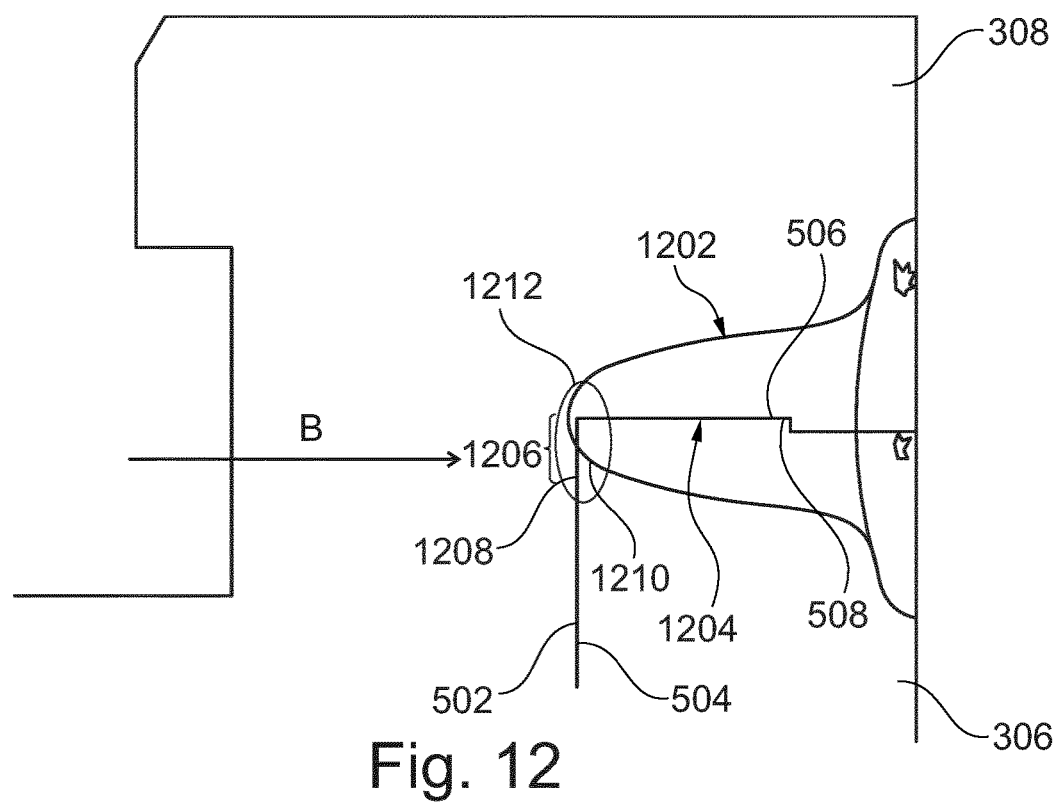
FIG. 12 is a cross-sectional view of the junction of the lid and container body, after friction stir welding.

FIG. 12 is a cross-sectional view of the junction of the lid and container body, after friction stir welding. As seen in FIG. 12, a friction weld zone 1202 encompasses the abutment 1204 of end surface portion 508 of container body 306 and second outer surface portion 506 of lid 308. In fact, although referred to as a weld, there is a fusion of the copper of the lid 308 and the container body 306 so that no imperfections are effectively detectable and every possible action is done by the manufacturer to guarantee that the fusion is perfect, without any impurities or defects.

For authentication purposes, in accordance with embodiments of the invention, ultrasonic waves from a second ultrasonic transducer (not shown) are transmitted (in the direction of arrow B) towards at least a vertical area 1206 just below the horizontal zone 1202 of friction stir welding where the aforementioned surfaces are in abutment. In this area 1206, there will be discontinuities due to the fusion of copper as a result of the fusion flow. These discontinuities form a unique integrity or signature, which cannot be reproduced. Thus, such discontinuities provide a means to detect faking of a lid 308 or canister 122. The discontinuity detectable by the second ultrasonic transducer may comprise a first discontinuity element 1208 at the abutment between first external surface 502 of lid 308 and internal surface portion 504 of container body 306. Alternatively or additionally, the detectable discontinuity comprises a second discontinuity element 1210 at the interface between the weld zone 1202 and container body 306 within illuminated area 1212 (and thus within area 1206).

Figure 13:
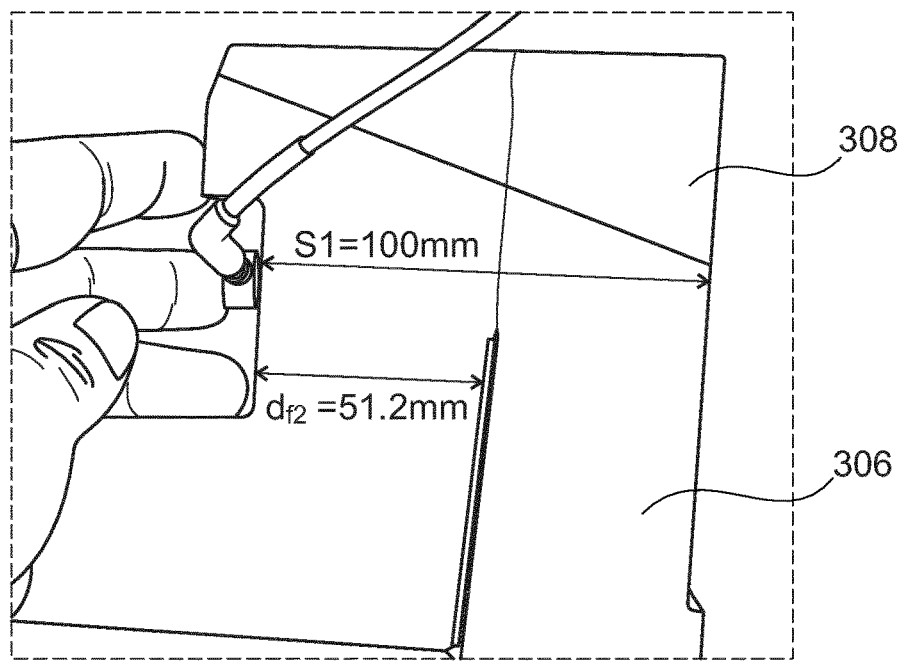
FIG. 13 is an alternative view of the junction of the lid and container body, showing dimensions according to a particular embodiment.

FIG. 13 is an alternative view of the junction of the lid 308 and container body 306, showing dimensions according to a particular embodiment. Using the second ultrasonic transducer (not shown), the overall (radial) thickness of the lid 308, in this example 100 mm, above the weld zone 1202 is measured.

Figure 14:
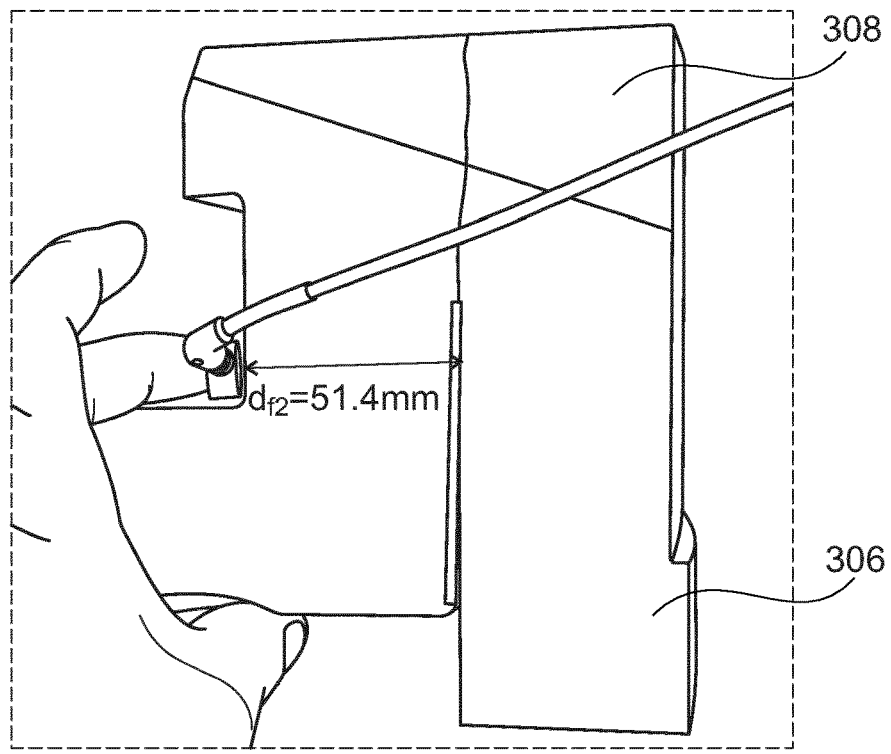
FIG. 14 is an alternative view of the junction of the lid and container body, showing dimensions according to a particular embodiment.

FIG. 14 is an alternative view of the junction of the lid 308 and container body 306, showing dimensions according to a particular embodiment. Again, using the second ultrasonic transducer (not shown), the smaller (radial) thickness of the lid 308, underneath the horizontal weld zone 1202 is measured, and in this example is 51.4 mm.

Figure 15:
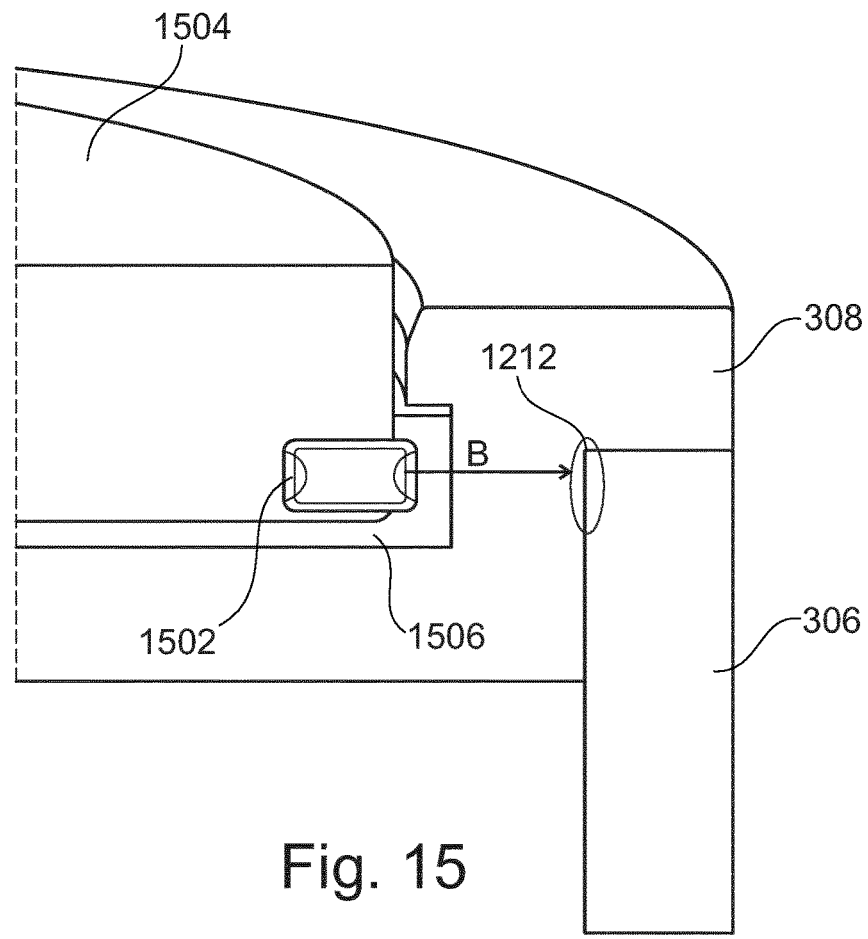
FIG. 15 is a cross-sectional view of the junction of the lid and container body, indicating a zone of random weld discontinuities.

FIG. 15 is a cross-sectional view of the junction of the lid 308 and container body 306, indicating a zone 1212 of random weld discontinuities. Thus, in-between the two areas of FIGS. 13 and 14 (i.e. areas of two distinct thicknesses) ultrasonic responses are measured using second ultrasonic transducer 1502 mounted on reading apparatus 1504. As mentioned previously, measurement is undertaken with water 1506 at least partially filling the lid 308. As discussed in further detail below, reading apparatus 1504 may rotate about the axis of the lid 308 while ultrasonic waves are directed (in the direction of arrow B) at area 1212. The response received back by second ultrasonic transducer 1502 constitutes a second scan signal, the first scan signal being that received by first ultrasonic transducer 802 (FIG. 8) when scanning over scannable elements 1006 (FIG. 10).

Figure 16:
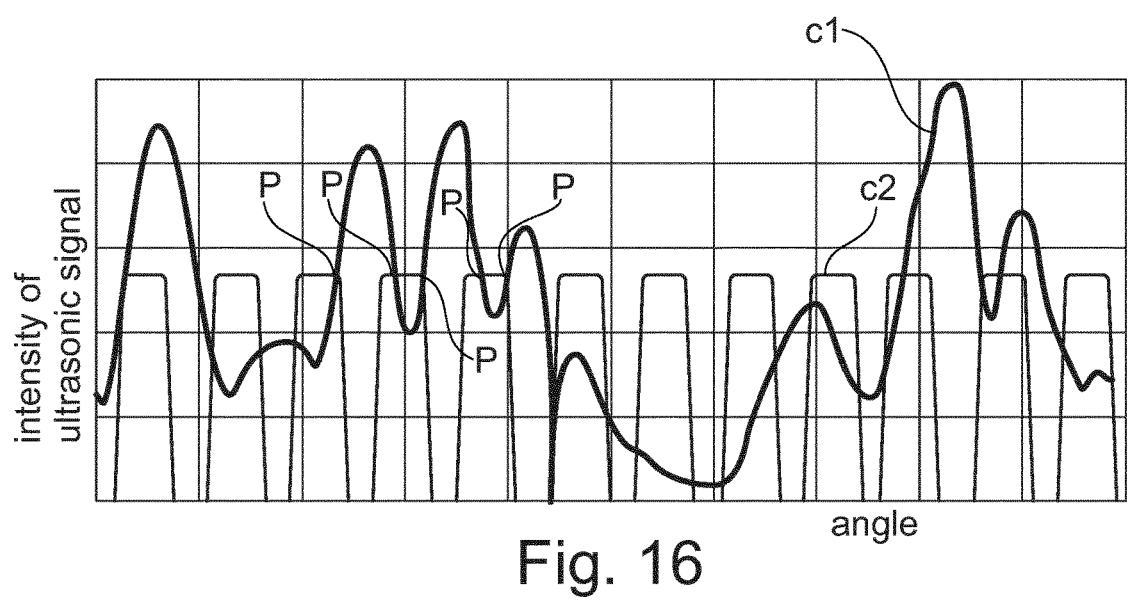
FIG. 16 illustrates the derivation of a third signal (curve) from the intersection points of first and second signals.

FIG. 16 illustrates the derivation of a third signal (curve) from the intersection points of first and second scan signals. In FIG. 16, the first scan signal (c2) and the second scan signal (c1) are plotted on the same graph. From these, points of intersection (P) can be derived or calculated, and a curve formed by the collection of points P forms a third signal, the third signal being used as a verification signal for authenticating the lid 308 and/or the canister 122. That is, the third signal may be compared with a pre-stored verification signal or signature, associated with the lid/canister identification code obtained, to determine whether a canister is authenticated. The combination of first and second scan signals to form a third signal is more closely described in EP 1 987 261 incorporated herein by reference.

Figure 17:
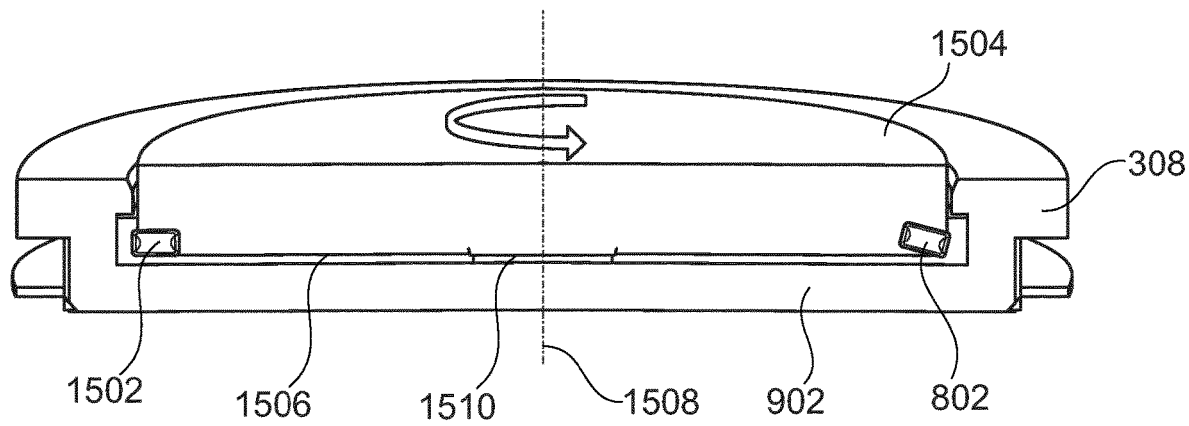
FIG. 17 shows a cross-sectional view of the lid having mounted thereon a reading apparatus for generating first and second scan signals.

FIG. 17 shows a cross-sectional view of the lid 308 having mounted thereon a reading apparatus 1504 for generating first and second scan signals. The reading apparatus 1540 rotates as indicated by arrow C about the axis 1508 of the lid 308. The reading apparatus 1504 is mounted on a suitable bearing 1510 and is at least partially submerged in water 1506. The first ultrasonic transducer 1802 is mounted so as to direct ultrasonic waves at an angle ($\alpha_1$; e.g. 14 degrees; see FIG. 9) to the plane of base surface 902 of lid 308. The second ultrasonic transducer 1502 is mounted so as to direct ultrasonic waves parallel to the plane of base surface 902, i.e. horizontally. Thus, in embodiments, the reading apparatus comprises first and second ultrasonic transducers, the transducers being mounted so as to direct ultrasonic waves at different angles onto the lid 308.

In the above embodiment, the first and second ultrasonic transducers 802, 1502 are diametrically opposed; however, it will be appreciated that these devices may be substantially co-located or circumferentially spaced at an angle of less than 180 degrees. The reading apparatus 1504 may be driven to rotate either clockwise or anti-clockwise. For the purposes of determining readings (first scan signal and second scan signal), the reading apparatus 1504 may be rotated at any suitable speed, e.g. in the range 1 rpm to 50 rpm, or preferably in the range 1 rpm to 10 rpm.

During rotation of the reading apparatus 1504, the first scan signal (for identification) and the second scan signal (for the integrity/authentication) are obtained.

In embodiments, the rotating mechanism, the ultrasonic acquisition system (reading apparatus 1504) and suitable processor devices are mounted in an integrated package in the lid 308, along with batteries enabling autonomous operation and possibly remote control. Thus, once retrieved, the obtained signals may be collected and stored or wirelessly transmitted to a remote location if needed. In embodiments, using the first scan signal (identification code), the system is operable to retrieve the original integrity signal (reading) associated with a canister 122 having this identification code, and the derived integrity signal (third signal) is compared with the retrieved integrity signal and a correlation factor calculated. A correlation factor above a predetermined threshold is indicative of the authenticity of the canister 122.

Once signal detection using the reading apparatus has been completed, the water 1506 is pumped out of lid 308 and into a platform tank (not shown), a connecting valve (not shown) and the reading apparatus 1504 removed.

While embodiments have been described by reference to embodiments of survey devices having various components in their respective implementations, it will be appreciated that other embodiments make use of other combinations and permutations of these and other components.

Thus, while there has been described what are believed to be the preferred embodiments of the invention, those skilled in the art will recognize that other and further modifications may be made thereto without departing from the spirit and scope of the invention, and it is intended to claim all such changes and modifications as fall within the scope of the invention.

| Legend: | |
|---|---|
| 102 | fuel assembly |
| 104 | nuclear power plant |
| 106 | road transport vehicle |
| 108 | ship |
| 110 | road transport vehicle |
| 112 | road |
| 114 | interim storage and processing site |
| 116 | receiving section |
| 118 | storage pool |
| 120 | encapsulation section |
| 122 | canister |
| 124 | holding area |
| 126 | road transport vehicle |
| 128 | ship |
| 130 | final repository |
| 132 | holding area |
| 134 | internal vehicle |
| 136 | ramp |
| 138 | first underground are |
| 140 | deposition machine |
| 142 | second underground area |
| 144 | deposition hole |
| 202 | fuel assembly |
| 204 | insert |
| 204' | insert |
| 206 | hole |
| 208 | encapsulation element |
| 210 | final repository storage arrangement |
| 302 | elongate recess |
| 302' | elongate recess |
| 306 | container body |
| 308 | lid |
| 310 | end |
| 402 | outer shoulder |
| 502 | first outer surface portion |
| 504 | first inner surface portion |
| 506 | second outer surface portion |
| 508 | end surface portion |
| 702 | inclined surface portion |
| 704 | lower edge |
| 802 | first ultrasonic scanner |
| 902 | base surface |
| 1002 | sectors |
| 1004 | perimeter |
| 1006 | scannable elements |
| 1202 | friction weld zone |
| 1204 | abutment |
| 1206 | vertical area |
| 1208 | first discontinuity element |
| 1210 | second discontinuity element |
| 1212 | illuminated area |
| 1502 | second ultrasonic transducer |

-continued

| Legend: | |
|---|---|
| 1504 | reading apparatus |
| 1506 | water |

The invention claimed is:

1. A container for nuclear and/or hazardous material, the container comprising:
a container body made of metal and a lid made of the same metal as the container body, the lid and container body being configured to be welded together to form a sealed container, the lid comprising:
a plurality of scannable elements, the scannable elements being spatially distributed on the lid and configured to be scanned with a first ultrasonic scanner;
wherein one or more of the scannable elements is an inclined surface element, each inclined surface element being inclined relative to an axis perpendicular to the plane of a base surface of the lid;
whereby upon scanning of the scannable elements with said first ultrasonic scanner, a first signal is produced, the first scan signal being dependent upon which of said plurality of scannable elements are inclined surface elements;
the container further comprising:
a weld zone formed at abutting surfaces of the container body and lid, the weld zone conferring unique properties on the container, the weld zone being configured to be scanned with a second ultrasonic scanner;
whereby upon scanning of the weld zone with said second ultrasonic scanner, a second scan signal is produced, the second scan signal being dependent upon said unique properties of the weld zone of the container.

2. The container according to claim 1, wherein the plurality of elements are arranged to compose an identity code of the container, said identity code contained in the first scan signal.

3. The container according to claim 1, wherein the lid is round and the scannable elements are disposed only at a circumferential perimeter or a peripheral edge of the lid.

4. The container according to claim 3, wherein the plurality of scannable elements comprise consecutive, equal length arcs of said circumferential perimeter, and wherein the arcs define an angle at a center of the lid in a range from 4-8 degrees.

5. The container according to claim 1, wherein a base wall and a sidewall of the lid have a thickness greater than a predetermined minimum thickness, and wherein a thickness of the lid between an inclined surface element and a nearest point on an upper surface of the lid is greater than the predetermined minimum thickness.

6. The container according to claim 1, wherein the lid has an axial cross-section whereby a first outer surface portion is defined thereon, for abutment with a first inner surface portion of the container body, wherein a base surface of the lid is defined extending perpendicular to the axis, and wherein the peripheral edge is defined by the intersection of the first outer surface portion and the base surface.

7. The container according to claim 1, wherein, for each inclined surface element, the angle of inclination ($\alpha_2$) is one of a plurality of predetermined angles in a range from 40 to 60 degrees.

8. The container according to claim 1, wherein the lid and container body are friction welded together to form a sealed container such that a weld zone conferring unique properties on the container is formed at abutting surfaces of the container body and lid, wherein the lid has a first outer surface portion for abutment with a first inner surface portion of the container body, and wherein the lid has a second outer surface portion for abutment with an end surface portion of the container body.

9. The container according to claim 8, wherein the weld zone overlaps at least a portion of (i) the abutting first outer surface portion and first inner surface portions, and/or (ii) the abutting second outer surface portion and end surface portions.

10. The container according to claim 8, wherein, in a vicinity of the weld zone, a signature surface element is formed by (i) a portion of the abutting first outer surface portion and first inner surface portions external to and adjacent the weld zone, and/or (ii) a portion of the surface of the weld zone inside the container body and adjacent the abutting first outer surface portion and first inner surface portions; and
wherein said unique properties of the container are dependent on said signature surface element.

11. The container according to claim 10, wherein the unique properties of the weld and/or said signature surface element are configured to produce an identity code of the container when scanned by said ultrasonic scanner.

12. A method of identifying and authenticating a container for nuclear and/or hazardous material according to claim 1, the method comprising:
operating a reading apparatus comprising the first ultrasonic scanner and the second ultrasonic scanner whereby the first ultrasonic scanner scans the scannable elements to produce a first scan signal indicative of an identification code of the container and the second ultrasonic scanner scans the vicinity of the weld zone to produce a second scan signal dependent on said unique properties and/or said signature surface element of the weld zone of the container;
deriving a third scan signal by joining points of intersection of the first scan signal and the second scan signal; and
comparing the third scan signal with at least one pre-stored signal to thereby authenticate the container.

13. The method of claim 12, wherein the container body is substantially cylindrical, the lid is round; and
wherein operating the reading apparatus comprises rotating the reading apparatus about the axis through the centre of the lid.

14. The method of claim 12, further comprising disposing water in an upper part of the lid whereby, during said operating the reading apparatus the reading apparatus is at least partially submerged in water, wherein, during said operating the reading apparatus, the first ultrasonic transducer is mounted so as to direct first ultrasonic waves at an angle of incidence ($\alpha_1$) to a plane of a base surface of the lid, and wherein the angle of incidence ($\alpha_1$) is derived by Snells law from the difference in speed of the first ultrasonic waves in water and in the material from which the lid is made.

15. The method of claim 14, wherein, during said operating the reading apparatus, the second ultrasonic transducer is mounted so as to direct second ultrasonic waves substantially parallel to the plane of the base surface.

16. The method of claim 12, wherein comparing the third scan signal with at least one pre-stored signal comprises:
using the identification code obtained from the first signal, retrieving the at least one pre-stored signal, the or each pre-stored signal being a pre-stored verification signal or signature;

calculating a correlation factor between the third scan signal and the pre-stored signal; and determining that the container is authenticated if the correlation factor is above a predetermined threshold indicative of authenticity.

17. A non-transitory recordable, rewritable or recorded medium having recorded or stored thereon non-transitory machine readable data defining or transformable into instructions for execution by processing circuitry and corresponding to at least the steps of the methods set out in claim 12.

18. A non-transitory server computer incorporating a non-transitory communications device and a non-transitory memory device and being configured for transmission on demand or otherwise of data defining or transformable into instructions for execution by processing circuitry and corresponding to at least the steps of claim 12.

* * * * *